United States Patent
Banta et al.

(10) Patent No.: US 10,349,068 B1
(45) Date of Patent: Jul. 9, 2019

(54) APPARATUS AND METHOD FOR PANORAMIC VIDEO HOSTING WITH REDUCED BANDWIDTH STREAMING

(71) Applicant: Amazon Technologies, Inc., Seattle, WA (US)

(72) Inventors: Bill Banta, Lafayette, CA (US); Paul Alioshin, Palo Alto, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/807,421

(22) Filed: Nov. 8, 2017

Related U.S. Application Data

(63) Continuation of application No. 14/040,390, filed on Sep. 27, 2013, now Pat. No. 9,838,687, which is a continuation-in-part of application No. 13/691,654, filed on Nov. 30, 2012, now Pat. No. 9,516,225.

(60) Provisional application No. 61/707,746, filed on Sep. 28, 2012, provisional application No. 61/566,269, filed on Dec. 2, 2011.

(51) Int. Cl.
| | |
|---|---|
| *H04N 7/00* | (2011.01) |
| *H04N 7/16* | (2011.01) |
| *H04N 19/40* | (2014.01) |
| *H04N 21/472* | (2011.01) |
| *H04N 21/218* | (2011.01) |
| *H04N 21/4728* | (2011.01) |

(52) U.S. Cl.
CPC ....... *H04N 19/40* (2014.11); *H04N 21/21805* (2013.01); *H04N 21/4728* (2013.01); *H04N 21/47202* (2013.01)

(58) Field of Classification Search
CPC ......... H04N 21/4728; H04N 21/21805; H04N 19/40
See application file for complete search history.

(56) References Cited

U.S. PATENT DOCUMENTS

| | | | |
|---|---|---|---|
| 5,319,465 A | 6/1994 | Squyres et al. | |
| 5,748,199 A | 5/1998 | Palm | |
| 6,043,837 A | 3/2000 | Driscoll, Jr. et al. | |
| 6,133,944 A | 10/2000 | Braun et al. | |
| 6,192,393 B1 | 2/2001 | Tarantino et al. | |
| 6,611,241 B1 | 8/2003 | Firester et al. | |
| 6,788,333 B1 | 9/2004 | Uyttendaele et al. | |
| 7,324,664 B1 | 1/2008 | Jouppi et al. | |
| 7,675,549 B1 * | 3/2010 | Brower | H04N 1/00244 348/157 |
| 8,334,905 B2 | 12/2012 | Bhan | |
| 8,406,562 B2 | 3/2013 | Bassi et al. | |
| 8,605,783 B2 | 12/2013 | El-Saban et al. | |
| 8,687,070 B2 | 4/2014 | Chen et al. | |
| 2002/0021353 A1 | 2/2002 | Denies | |
| 2002/0049979 A1 | 4/2002 | White et al. | |
| 2002/0067412 A1 | 6/2002 | Kawai et al. | |
| 2003/0030678 A1 | 2/2003 | Rosenholtz et al. | |
| 2003/0197785 A1 | 10/2003 | White et al. | |

(Continued)

*Primary Examiner* — Rebecca A Volentine

(74) *Attorney, Agent, or Firm* — K&L Gates LLP

(57) ABSTRACT

A server includes an input node to receive video streams forming a panoramic video. A module forms a suggested field of view in the panoramic video. The suggested field of view is based upon a viewing parameter, such as a client device motion parameter or a motion prediction parameter. An output node sends the suggested field of view to a client device.

20 Claims, 5 Drawing Sheets

(56) References Cited

U.S. PATENT DOCUMENTS

| | | |
|---|---|---|
| 2004/0030527 A1 | 2/2004 | Rankin |
| 2004/0032495 A1 | 2/2004 | Ortiz |
| 2004/0264919 A1 | 12/2004 | Taylor et al. |
| 2005/0002535 A1 | 1/2005 | Liu et al. |
| 2005/0280701 A1 | 12/2005 | Wardell |
| 2006/0204142 A1 | 9/2006 | West et al. |
| 2006/0215753 A1 | 9/2006 | Lee et al. |
| 2006/0294467 A1 | 12/2006 | Auterinen |
| 2007/0035612 A1 | 2/2007 | Korneluk et al. |
| 2007/0250898 A1 | 10/2007 | Scanlon et al. |
| 2009/0284601 A1 | 11/2009 | Eledath et al. |
| 2009/0300692 A1 | 12/2009 | Mavlankar et al. |
| 2010/0034425 A1 | 2/2010 | Lin et al. |
| 2010/0050221 A1 | 2/2010 | McCutchen et al. |
| 2010/0150458 A1 | 6/2010 | Angell et al. |
| 2010/0296571 A1 * | 11/2010 | El-Saban ......... H04N 21/21805 375/240.01 |
| 2010/0299630 A1 | 11/2010 | McCutchen et al. |
| 2011/0202603 A1 * | 8/2011 | Mate ................ H04N 21/23431 709/205 |
| 2011/0214072 A1 | 9/2011 | Lindemann et al. |
| 2012/0057852 A1 | 3/2012 | Devleeschouwer et al. |
| 2012/0077522 A1 | 3/2012 | Mate et al. |
| 2012/0098925 A1 | 4/2012 | Dasher et al. |
| 2012/0210252 A1 | 8/2012 | Fedoseyeva et al. |
| 2012/0242781 A1 | 9/2012 | Gautier et al. |
| 2013/0070047 A1 | 3/2013 | Digiovanni et al. |
| 2013/0141523 A1 | 6/2013 | Banta et al. |
| 2013/0141526 A1 | 6/2013 | Banta et al. |
| 2013/0328910 A1 | 12/2013 | Jones et al. |

\* cited by examiner

APPARATUS AND METHOD FOR PANORAMIC VIDEO HOSTING WITH REDUCED BANDWIDTH STREAMING

CROSS-REFERENCE TO RELATED APPLICATIONS

This application is a continuation of U.S. patent application Ser. No. 14/040,390, filed Sep. 27, 2013, now U.S. Pat. No. 9,838,687, which is a continuation-in-part of U.S. Ser. No. 13/691,654, filed Nov. 30, 2012, now U.S. Pat. No. 9,516,225, which claims priority to U.S. Provisional Patent Application 61/566,269, filed Dec. 2, 2011, the contents of which are incorporated herein by reference. This application also claims priority to U.S. Provisional Patent Application 61/707,746, filed Sep. 28, 2012, the contents of which are incorporated herein by reference.

FIELD OF THE INVENTION

This invention relates generally to panoramic video signal processing. More particularly, this invention relates to techniques for reduced bandwidth streaming of segments of a panoramic or high-resolution video to networked client devices.

BACKGROUND OF THE INVENTION

Panoramic video images may be acquired using a group of cameras or a single wide-angle camera. The panoramic video images may be uploaded to a server where the images are made available to networked client devices. Consequently, the networked client devices may follow an event that is being panoramically videoed and request perspectives of interest. Such processing generates large volumes of video data that must be processed and transmitted in an efficient manner.

SUMMARY OF THE INVENTION

A server includes an input node to receive video streams forming a panoramic video. A module forms a suggested field of view in the panoramic video. The suggested field of view is based upon a viewing parameter, such as a client device motion parameter or a motion prediction parameter. An output node sends the suggested field of view to a client device. The suggested field of view may be a single stream or a combination of streams.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
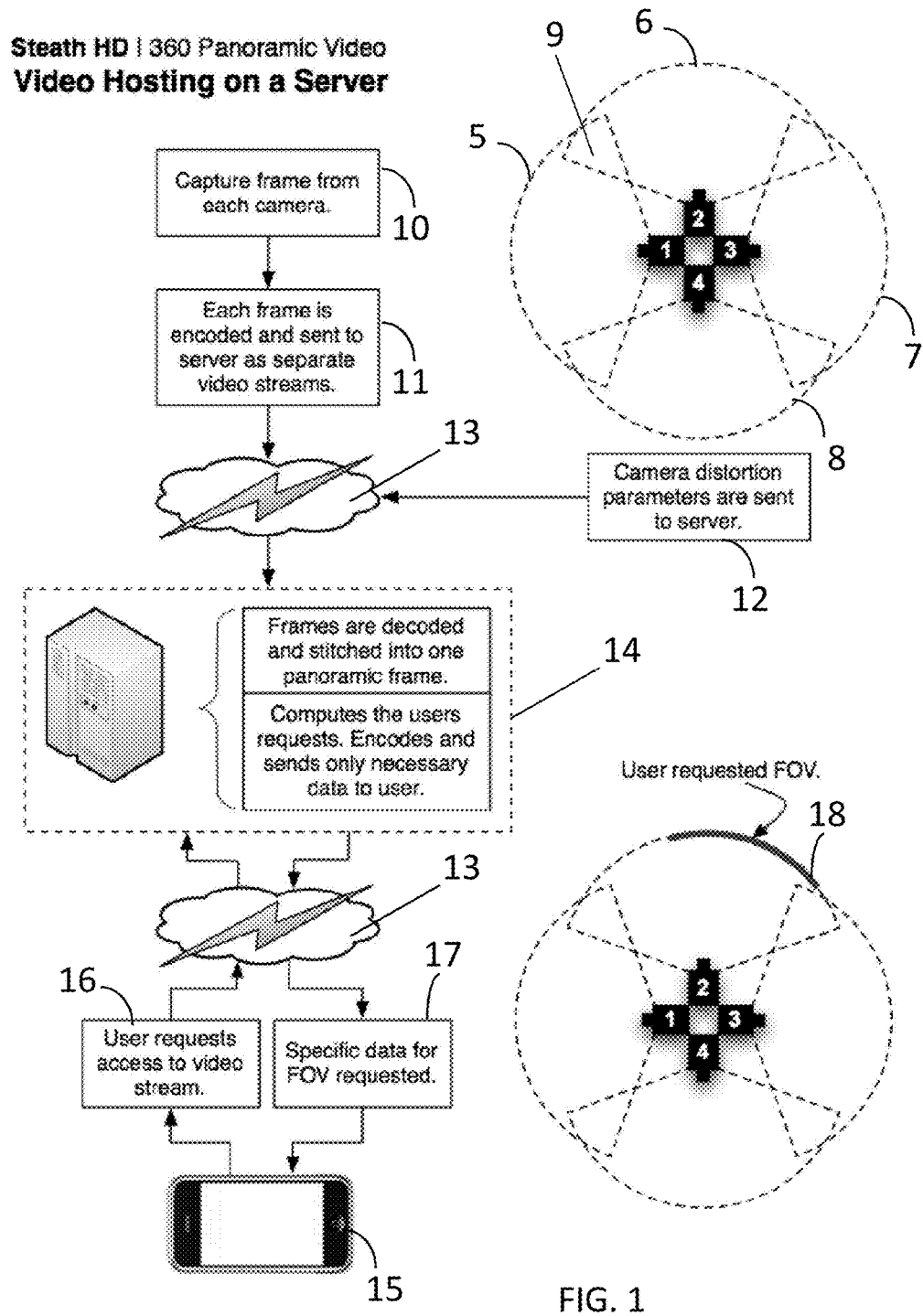
FIG. 1 illustrates a system configured in accordance with an embodiment of the invention.

FIG. 1 illustrates a system configured in accordance with an embodiment of the invention. In this example, the system includes four cameras 1, 2, 3 and 4. Each camera has a field of view, respectively 5, 6, 7 and 8, which forms a panoramic field of view. Field of view overlap regions 9 may exist.

Frames are captured from each camera 10 and then each frame is encoded and is sent to a server as a separate video stream 11. Camera distortion parameters may also be sent 12, as described in the commonly owned co-pending patent application entitled "Apparatus and Method for Video Image Stitching Utilizing Alignment and Calibration Parameters," Ser. No. 13/691,632, filed Nov. 30, 2012, the contents of which are incorporated herein by reference.

The cameras 1, 2, 3, 4 may include a wired or wireless link to network 13. Server 14 is also connected to network 13. An input node of the server 14 receives the video signals. The server 14 decodes frames and stitches them into a panoramic frame. The server 14 receives user requests and encodes necessary data to service each request. In one embodiment, the server includes a module with executable instructions to form a suggested field of view in the panoramic video. An output node of the server sends video signals to a client device.

The user requests are from a client device 15, such as a smartphone, tablet, personal computer, wearable computation device and the like. A user requests access to a video stream 16. The server 14 services the request and delivers the requested video through the network 13 as specific data for a requested field of view 17, which may then be displayed on the client device 15. FIG. 1 illustrates a requested field of view 18, which is a segment of the panoramic video image. The field of view 18 is a projection of video from the real world in a virtual space. By giving the user a virtual field of view within the projection space, users have the opportunity to navigate a real world environment within the virtual world. This allows users to virtually interact with real world content remotely in real time, or at a later time after the video data has been captured. With the completed video stream, users can return to a real world event after an event and use their virtual field of view to engage with the real world content in new ways, as if they were experiencing the event again in real time and in person.

The invention allows for multiple image processing services to be conducted on server 14. For example, the server 14 may provide error detection and correction. Further, the server 14 may map and learn user interactions with the video content to optimize data streams. The server 14 can also monitor available bandwidth on the network 13. The server 14 can then stream only field of view 18 to the device 15, or it can stream additional data outside of the field of view 18 to enable smoother navigation of the video stream. When additional data outside the field of view is sent to the client device, but the entire panoramic video stream is not streamed to the client device, this extra video data is referred to as the buffer.

This invention allows for additional image processing and error detection/correction to take place than would be typically available on a stand-alone panoramic camera system. The invention is especially helpful in situations where the panoramic video cameras are mobile or have limited processing power. Video hosting on the server reduces processing and power requirements at the camera system as well as the viewing device, while still providing high-quality video to the end user. The server may be configured to provide field of view suggestions based on user data. The field of view suggestions may be based upon user field of view tracking. By monitoring user interactions with the video stream, the server 14 can perform two additional tasks. First, the host can suggest starting conditions that orient the user's field of view 18 in the most highly viewed area of the panoramic video stream. Second, the server can also stream the entire field of view in low resolution to the device 15 (if network 13 bandwidth allows) and then stream high-resolution video data only for the field of view most viewed by other users on the system. In an entertainment use case, this embodiment of the invention can optimize the user experience because it allows the user to freely explore all 360 degrees of the video stream, but the transition from low-resolution to high-resolution video will help guide users toward viewing a specific field of view.

An ultra wide-angle video stream has the ability to display more than 60 degrees of video content at one time. Some applications for ultra wide-angle video may require image processing and/or data compression downstream from the image capture device. Image processing can be performed on a server or other host computer source that is connected to the image capture invention via the network 13, which may employ wireless data transmission, hardwired data transmission, or some other data transmission protocol such as satellite communications.

The server 14 provides additional image processing capabilities and has the ability to correct for errors created by the image capture device or errors created during the transmission of the data.

Data may be streamed from the video camera system to a server as individual video streams that are unprocessed. These video streams could be raw or compressed data. The host server can then take these four camera streams, process the data to improve image quality, and stitch the images together to create a 360-degree video stream.

Because some users will be viewing the video content on devices that are not capable of processing ultra wide-angle video, the server will provide additional image processing and compression algorithms than are available on the image capture device or on the viewing device. By communicating with an individual user's device, and monitoring how large portions of the viewing population are interacting with the video stream, software on the server will be able to estimate where a user is most likely to pan their individual frame of reference on their viewing device. For example, if a set of users are watching a panoramic video, the server may track panning sequences and popular fields of view to make estimates or suggestions for viewing perspectives. In this way, the host is able to communicate only the data needed to support a particular action, thus reducing the total amount of data that is streamed to every user. This prevents the entire video data stream from being sent to every single user. Sending the complete video stream to every user could overload the viewing system or network infrastructure that users are utilizing to download the video stream.

The social aspect of video interaction will enable users to view and experience a video in a similar way as a community or social group of users. Data about how each video file of ultra wide-angle video is viewed and navigated is saved and stored for later use.

Figure 2:
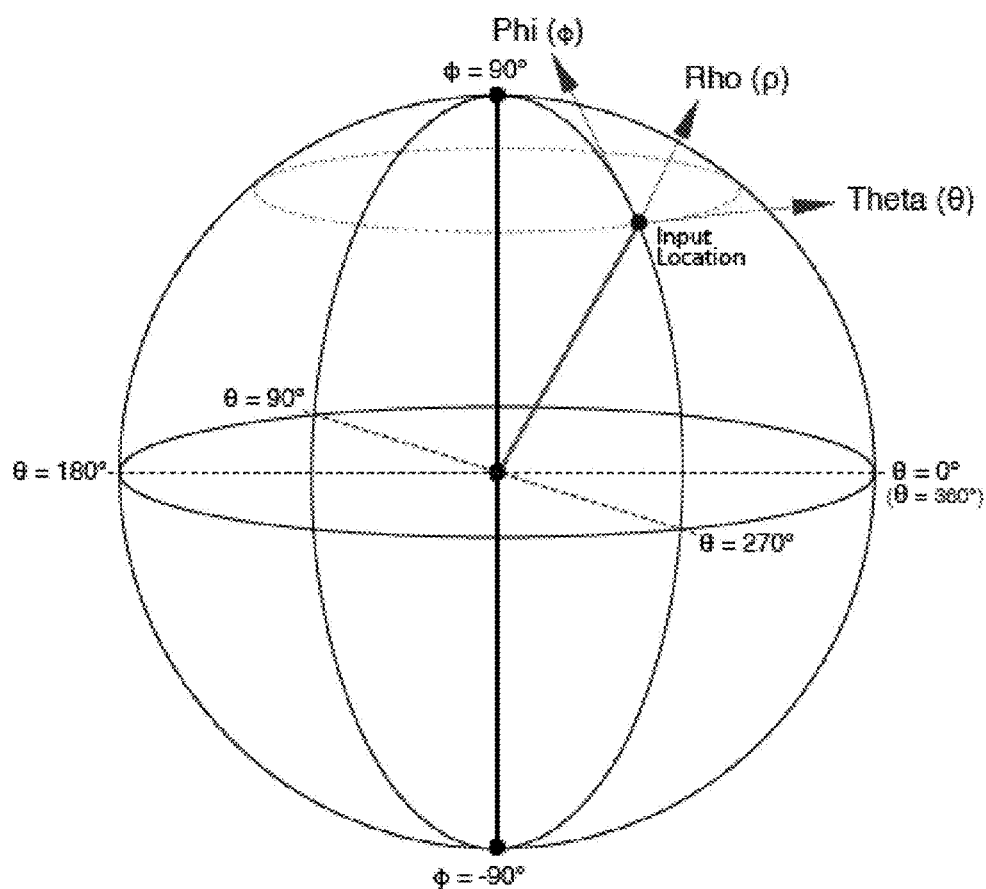
FIG. 2 illustrates a coordinate system that may be utilized in accordance with an embodiment of the invention.
Figure 3:
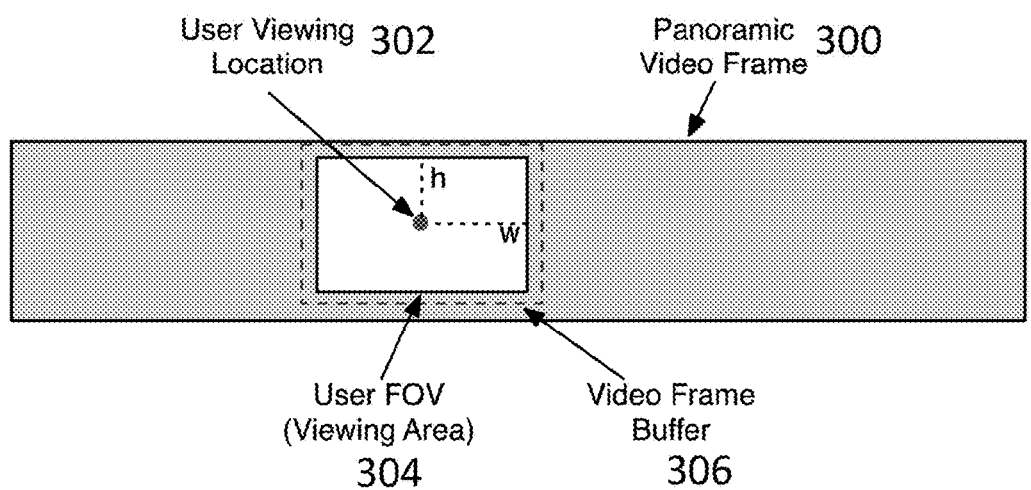
FIG. 3 illustrates field of view parameters associated with an embodiment of the invention.

To reduce the overall bandwidth when streaming 360-degree panoramic video content to the user, the coordinate system in FIG. 2 may be used to determine where the user is looking. Once that location is known only the specific video data in the user's field of view and a small buffer around the field of view is delivered via network stream to the user. In one embodiment, the user location is defined as the center point of the user's field of view, which is defined as 2× the height and 2× the width referenced from the user's location. This is demonstrated in FIG. 3. In particular, FIG. 3 illustrates a panoramic video frame 300 with a computed viewing location 302 within a field of view 304. A video frame buffer 306 is slightly larger than the field of view 304. This buffer may adaptively grow larger or smaller or change in shape depending on the user's navigation speed and network bandwidth. If the user starts to pan quickly, the buffer would grow larger (if network bandwidth allows). If the user starts to pan more slowly, the buffer would grow smaller. In cases where network bandwidth is not constrained, the buffer will be made as large as possible to enable the smoothest navigation experience within the viewing application. For scenarios where bandwidth is constrained, the size of the buffer area can be reduced to reduce the total amount of data that needs to be streamed over the network. As soon as the user's viewing area changes, the updated viewing location needs to be streamed to the host. If network speeds allow for the feedback loop in FIG. 1 (between the viewing device 15 and the host 14) to be instantaneous, then the buffer size can be reduced. When the feedback loop takes a meaningful amount of time to re-orient the user location and then stream new video data to the user, the buffer size should be 2× the average user's navigation speed. For example, if the average user navigates at 5 degrees per second, the buffer size should be 10 degrees on all sides of the viewing area. It should be appreciated that the field of view parameters may not be an extension of the existing user field of view in all directions. In other words, the buffer area need not be uniform, as depicted in FIG. 3. The buffer area and field of view also do not need to be composed of a single video data stream. Multiple small data streams could be sent to the end-user device, which composes the final video to be displayed to the user.

In one embodiment, two input parameters are sent to the server. One parameter is the user's viewing location based upon the coordinate system of FIG. 2. The user location is defined as the center point 302 of the field of view 304. This input parameter is only sent to the server when it changes. Another parameter is the user's current field of view 304. This input parameter is only sent to the server when it changes.

In order to keep the video playing smoothly while the user moves, a small buffer 306 is added to the video frame. This gives the server time to respond to the change in location and update the video stream sent to the user accordingly without the user noticing disrupted video playback.

The following parameters may be used to calculate the user's location with respect to the panoramic frame in the coordinate system of FIG. 2.

$$\text{User Area} = (1280 \text{ px}, 700 \text{ px})$$

$$panoHeight \text{ (total height of panoramic video stream)} = 720 \text{ px}$$

$$panoWidth \text{ (total width of panoramic video stream)} = 4000 \text{ px}$$

$$\rho \text{ (radius)} = 340 \text{ px}$$

$$\phi = 0°$$

$$\theta = 92°$$

$$x = \left(\frac{panoWidth}{360°}\right) * \theta$$
$$= \left(\frac{4000 \text{ px}}{360°}\right) * 92°$$
$$= 1022 \text{ px}$$

$$y = (panoHeight/2) - \rho * \sin\left(\phi * \frac{\pi}{180°}\right) * (panoHeight/180°/2)$$
$$= (720 \text{ px}/2) - 340 \text{ px} * \sin\left(0° * \frac{\pi}{180°}\right) * (720 \text{ px}/180°/2)$$
$$= 360 \text{ px} - 0 \text{ px} = 360 \text{ px}$$

The disclosed video hosting service allows for mobile video to be streamed live more efficiently since some of the image processing and image stitching processing can take place at the server, where it is not limited by battery power or processing constraints.

Applications include live sporting events where athletes, referees, or other equipment is outfitted with a panoramic video camera. Similar applications involve military or surveillance applications where it is not practical to have a complete processing system at the capture system due to weight, power, size, or other constraints. Since there will be many images streaming at once, and since many of these systems will have limited power supplies and processing power, the server allows for production of a much higher quality video stream for the end user.

By communicating with a large population of users, the server is able to establish and learn trends about where users are panning and zooming their individual frames of reference. By saving and processing this data, the software on the server is able to establish starting conditions that optimize the viewing experience and send suggestions to future users about where to navigate their individual frame of reference, leading to a more rewarding experience.

Servers tracking how populations and/or social groups are interacting with a video stream can allow the server to do a number of functions. For example, the server may set the home screen to the most popular field of view in the image circle. The server may send the highest quality video data to the most watched portions of the video stream and lower quality video data for other portions of the video stream. In this scenario, high-definition video data may only be streamed to 80 degrees of the viewing area, leaving 280 degrees of video data to be streamed in a lower resolution. This reduction in resolution for selective parts of the video stream allows users to continue to experience high-definition video at the most interesting area of the video, while also being able to freely navigate 360 degrees of video while consuming less network bandwidth. This scenario also guides users to a specific area of the video stream. This can be extremely useful in entertainment applications where users will be guided toward more interesting portions of the video stream because they are at a higher resolution. The server may also meter the data rates for portions of the image circle that are not getting high usage. Therefore, data can be sent between telecommunication companies and the host to throttle back data to certain portions of the video if there are bandwidth restrictions. User viewer data may also be used to crop the panoramic video and create a standard field of view video so that people can watch through widely available video servers like YouTube® or Vimeo®. This tracking information can also be used to allow one user to observe and experience another user's experience by following or subscribing to a certain user's video stream and field of view.

Figure 4:
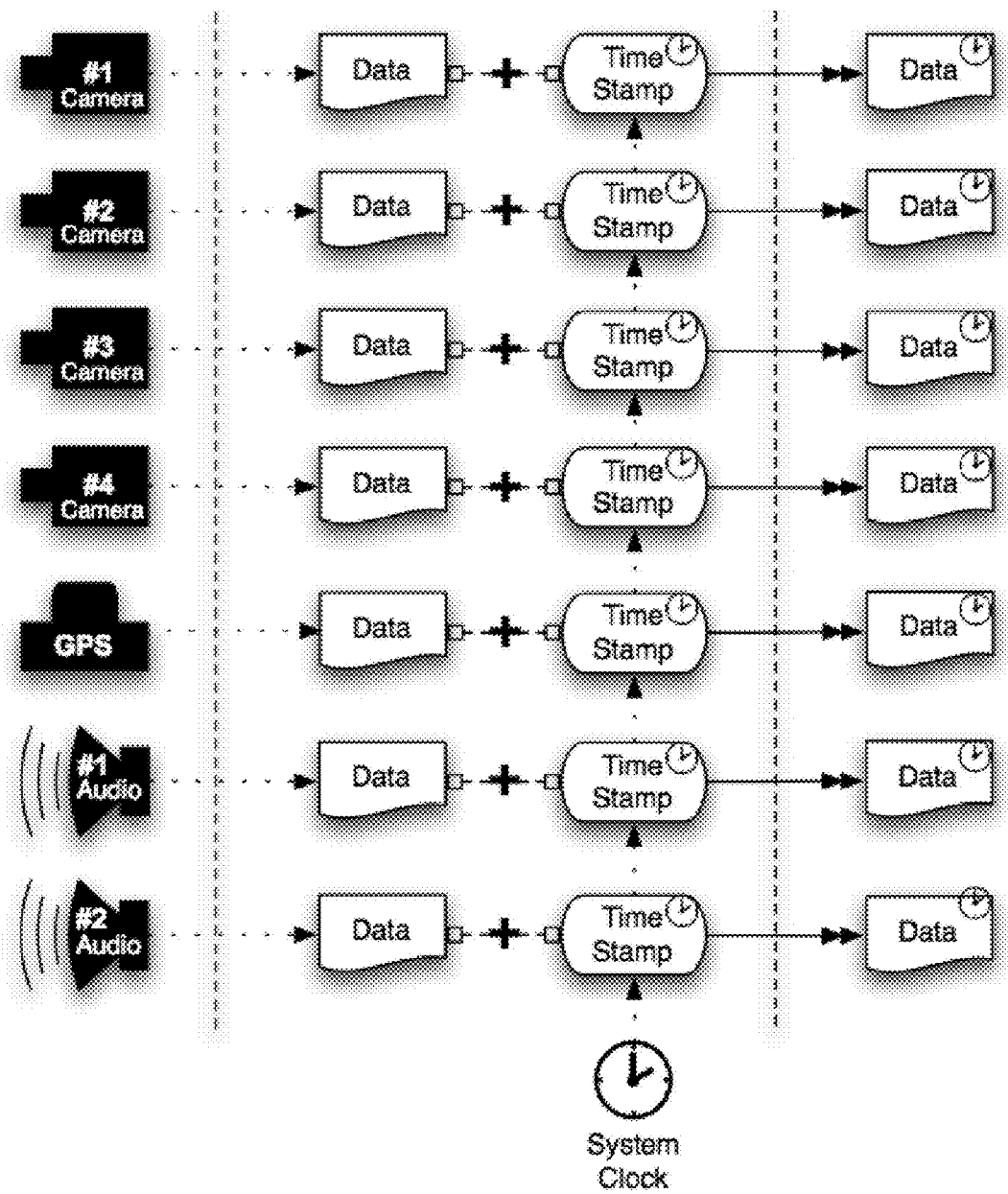
FIG. 4 illustrates a time-stamping technique utilized in accordance with an embodiment of the invention.

FIG. 4 illustrates time-stamping operations that may be performed in accordance with an embodiment of the invention. Each video stream is encoded with a time stamp before it is sent to the server for processing. This ensures that the server is accurately processing all frames synchronously regardless of network latency.

In one embodiment, the system has one clock or multiple clocks that are synchronized at start-up (or at a specified interval). A time stamp is applied to each frame from each camera. Intervals could be 30 times per second to coincide with a 30-frames-per-second image capture rate. For a data stream like GPS that may only have one output per second, the GPS output will be time-stamped at the next time-stamping interval after output (1/30th of a second).

This allows for back-end processing of multiple video streams and reassembly of multiple image streams into a single, panoramic video stream. The time stamping is also applied to associated or complementary data streams that may have been additional accessories to the panoramic video camera system. These accessories could include a microphone, digital compass, gyroscope, accelerometer, altimeter, GPS, or any other sensing device that may provide data that could be used or displayed with the video content.

An aspect of the disclosed technology reduces the bandwidth required to stream panoramic video to users. An active communication loop between the viewing computer or mobile device 15 and the video host 14 enables the host to selectively stream portions of wide-angle video data to users that is specific to the area of the video that is of interest to an individual user. Thus, a user may actively navigate panoramic video without having to download or stream the entire video at once.

This method also allows the host server to actively learn where and how a population of users is navigating within a certain video stream. Using this data, the server can actively update how the videos are buffered to provide the best quality streaming and navigation for each individual user.

As used herein, ultra wide angle will be considered any video stream with a field of view greater than 20 degrees of video content at one time or video content that does not fit within the native screen ratio of 1.5:1 (iPhone screen ratio) or 16:9 (HDTV aspect ratio).

Users have the ability to view the entire video stream at once in standard resolutions and in typical aspect ratios such as 1.5:1 or 16:9. The user is not constrained to any specific form factor (landscape or portrait). For example, consider a 180-degree field of view ("FOV") using a 1.5:1 aspect ratio for this disclosure.

Each individual user provides feedback about the user's area of interest to a host through the device user interface (e.g., touch, gyro, gestures, etc.). The user has the ability to move his or her specific FOV throughout the video stream in three axes: vertical, horizontal, and zoom. Video data that is outside the actual device's active field of view is streamed to the device. However, only a small portion of the total video data needs to be streamed.

Consider a case where a complete 360 degrees of video is available for viewing. In the case of a viewing device and aspect ratio that provides a user a 70-degree field of view, 90 degrees of video could be streamed to the device providing an additional 10 degrees of video data that the user can instantly navigate. Only streaming 90 degrees of a 360-degree video stream can lead to a 75% reduction in bandwidth while still enabling the user to actively navigate the video stream without a performance loss. The additional video data outside the user's immediate field of view is considered a video frame buffer that enables smooth navigation notwithstanding network and system latency.

As the user deviates from the center position, the device will communicate with the host and stream data from a separate part of the video stream. For example, if 0 degrees is designated as the center position of the viewer at a given time, and the host is streaming a field of view of 90 degrees to the viewer, the host may stream data from −45 degrees to +45 degrees to the viewer. The amount of video buffer on either side of the user's field of view is dynamically adjusted to reflect trends in user navigation. As the user begins to navigate the video stream, the center point of the viewer may change to 10 degrees. As the user is navigating the stream, the viewer communicates this data back to the host, and a revised portion of the video stream is streamed to the viewer. In the case where the user moves the center point of the viewer to 10 degrees, now the host streams video data from −35 degrees to +55 degrees.

Figure 5:
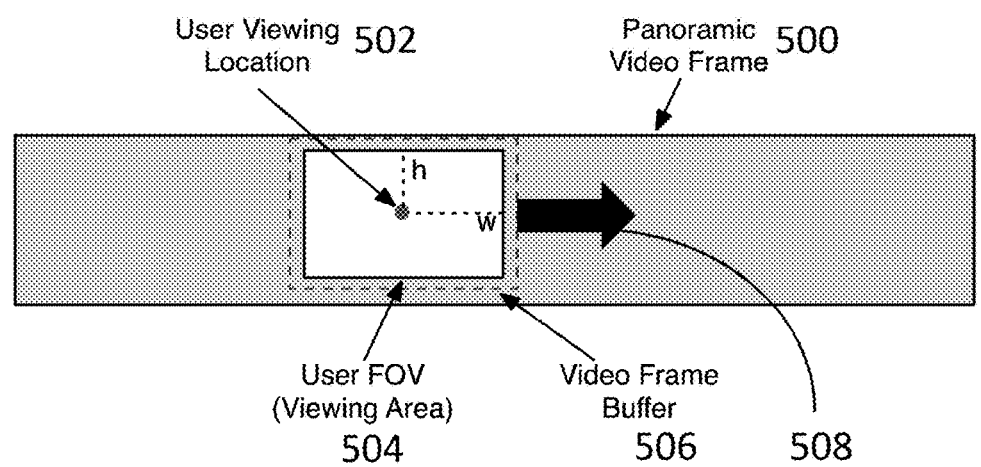
FIG. 5 illustrates field of view parameters based upon a viewing parameter, such as a client device motion parameter or a motion prediction parameter.

The video frame buffer can also have its size and shape adjusted based on user behavior as well as data from a large population of users who have already interacted with the video stream. FIG. 5 shows how the frame buffer size and shape can be adjusted to account for a user's behavior. In FIG. 5, the user is navigating rapidly to the right of the video stream, as shown with arrow 508. In this scenario, there is no need to buffer video data in a region that the user is unlikely to select. By buffering a larger amount of video in the direction that the user is navigating, the system provides a higher level of system performance and maintains smoother playback of the video while navigating. That is, video frame buffer 506 slides to the right to maintain a buffer around viewing area 504.

When using input sensors such as gyroscopes and accelerometers, the user interface software calibrates the neutral position when the video begins playing on the device. A small delay before the video starts may be used to allow the user to place his or her input device into a neutral position. The input device can be the same device that is displaying the video (e.g., a computer or a mobile device). The input device could also be a remote control or a gesture tracking device if the user is viewing the video on a television or other monitor.

The video frame buffer area can be broken down into smaller segments to allow the system to have more degrees of freedom to adjust size and shape of the video frame buffer area. Also, segmenting the video frame buffer area into smaller polygons allows the system to effectively transmit smaller batches of data to the viewing device.

The invention gives users the ability to navigate video streams that have a larger field of view than can be viewed easily given the aspect ratio and size/resolution of the viewing device. This is especially important for people who want to view and navigate panoramic or high-resolution video on a mobile device such as a smartphone or a tablet. Thus, the techniques of the invention are applicable to any large field of view image (i.e., not necessarily a panoramic image).

The user interface is useful in medical or defense applications where the user may want to change their field of view to gain a better perspective of the target feature they are looking for in the source video. The invention allows users to navigate standard video streams with a native resolution that does not match the native resolution of the viewing area. The invention also allows users to navigate a standard video stream that has been zoomed-in so that the viewing device does not show all of the video data at one time, allowing the user to navigate using gestures, motion, or other user interface input to enable a more intuitive environment for video navigation.

The invention reduces the total amount of bandwidth required to stream panoramic video to a viewing device. This reduces bandwidth constraints on networks, allowing for more users to stream video data simultaneously over the same network. This also allows the user to view a higher resolution segment of the source video when bandwidth limitations exist.

Reducing bandwidth of streaming video allows for real-time navigation of panoramic video while reducing the total amount of data that must be stored locally on a device. This can be critical for mobile applications where storage may be limited. Reducing the total amount of data that needs to be streamed, stored, and processed also reduces power consumption, improving battery life in mobile products. Reducing the amount of data that needs to be processed also allows the video to be viewed on a broader range of devices and computers because overall image processing requirements are reduced.

An embodiment of the present invention relates to a computer storage product with a computer-readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs, and holographic devices; magneto-optical media; and hardware devices that are specially configured to store and execute program code, such as application-specific integrated circuits ("ASICs"), programmable logic devices ("PLDs"), and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. A method, comprising:
   receiving a request from a requesting client device for at least a first portion of a video comprising multiple fields of view;

determining a first suggested field of view of the video at a first time, wherein the first suggested field of view is determined based upon first data received from a plurality of client devices, the first data based on viewing parameters associated with the plurality of client devices at the first time;

identifying a second portion of the video that at least one of the plurality of client devices displayed;

sending the first suggested field of view to the requesting client device;

sending the second portion of the video to the requesting client device;

determining a second suggested field of view of the video at a second time, the second suggested field of view different from the first suggested field of view, wherein the second suggested field of view is determined based upon second data received from the plurality of client devices, the second data based on viewing parameters associated with the plurality of client devices at the second time; and sending the second suggested field of view to the requesting client device.

2. The method of claim 1, further comprising:
receiving a plurality of image frames;
generating the video from the plurality of image frames; and
evaluating time stamps associated with the plurality of image frames.

3. The method of claim 1, further comprising:
increasing a size of a buffer associated with the first suggested field of view to include the second portion of the video;
determining an average navigation speed of the plurality of client devices in terms of a first number of degrees per unit of time; and
increasing the size of the buffer to a second number of degrees, wherein the second number of degrees is at least twice the first number of degrees.

4. The method of claim 1, further comprising:
increasing a size of a buffer associated with the first suggested field of view to include the second portion of the video, wherein the buffer comprises buffered image data; and
segmenting the buffered image data into a number of polygons including at least one oblique angle.

5. The method of claim 1, further comprising:
sending the first suggested field of view to the requesting client device at a first resolution; and
sending a different field of view to a second requesting client device at a second resolution lower than the first resolution, wherein the different field of view has been requested fewer times by the plurality of client devices relative to the first suggested field of view.

6. The method of claim 1, further comprising:
receiving a plurality of image frames, wherein the plurality of image frames are recorded for an event; and
sending the first suggested field of view to the requesting client device while the event is occurring.

7. The method of claim 1, wherein the viewing parameters associated with the plurality of client devices at the first time comprise a motion parameter of the requesting client device.

8. The method of claim 1, wherein the viewing parameters associated with the plurality of client devices at the first time comprise a motion prediction parameter based upon view selections from the plurality of client devices.

9. The method of claim 8, wherein the motion prediction parameter is based upon evaluating panning sequences from the plurality of client devices.

10. The method of claim 8, wherein the motion prediction parameter is based upon evaluating popular field of view selections from the plurality of client devices.

11. The method of claim 1, wherein the video has a first resolution in the first suggested field of view and a second resolution outside the first suggested field of view, wherein the first resolution is higher than the second resolution.

12. A method, comprising:
determining a first suggested field of view of a recorded event at a first time, wherein the first suggested field of view is determined based upon first data received from a plurality of client devices, the first data based on viewing parameters associated with the plurality of client devices at the first time;
sending to a requesting client device a first video stream comprising the first suggested field of view of the recorded event;
determining a second suggested field of view of the first video stream at a second time, the second suggested field of view different from the first suggested field of view, wherein the second suggested field of view is determined based upon second data received from the plurality of client devices, the second data based on viewing parameters associated with the plurality of client devices at the second time;
sending the second suggested field of view to the requesting client device;
determining a third suggested field of view of the recorded event, wherein the third suggested field of view is determined based upon user interactions; and
sending to the requesting client device a second video stream comprising the third suggested field of view of the recorded event.

13. The method of claim 12, further comprising increasing a size of a buffer associated with the first suggested field of view to include the third suggested field of view of the recorded event.

14. The method of claim 12, further comprising:
sending the first suggested field of view to the requesting client device at a first resolution; and
sending a different field of view to a second requesting client device at a second resolution lower than the first resolution, wherein the different field of view has been requested fewer times by the plurality of client devices relative to the first suggested field of view.

15. A method, comprising:
sending to a requesting client device at least a first portion of a multiview video requested by the requesting client device, the multiview video comprising a plurality of fields of view;
determining a first suggested field of view of the multiview video at a first time, wherein the first suggested field of view is determined based upon first data received from a plurality of client devices, the first data based on viewing parameters associated with the plurality of client devices at the first time;
identifying a second portion of the multiview video that the plurality of client devices displayed;
increasing a size of a buffer associated with the first suggested field of view to include the second portion of the multiview video;
sending to the requesting client device the first suggested field of view and the buffer including the second portion of the multiview video;

determining a second suggested field of view of the video at a second time, the second suggested field of view different from the first suggested field of view, wherein the second suggested field of view is determined based upon second data received from the plurality of client devices, the second data based on viewing parameters associated with the plurality of client devices at the second time; and sending the second suggested field of view to the requesting client device.

16. The method of claim 15, further comprising:

receiving a plurality of image frames of an event;

generating the multiview video from the plurality of image frames; and sending the first suggested field of view to the requesting client device while the event is occurring.

17. The method of claim 15, wherein the buffer comprises buffered image data, and wherein the method further comprises segmenting the buffered image data into a number of polygons including at least one oblique angle.

18. The method of claim 15, further comprising:

sending the first suggested field of view to the requesting client device at a first resolution; and sending a different field of view to a second requesting client device at a second resolution lower than the first resolution, wherein the different field of view has been requested fewer times by the plurality of client devices relative to the suggested field of view.

19. The method of claim 15, wherein the viewing parameters associated with the plurality of client devices at the first time comprise a motion parameter of the requesting client device.

20. The method of claim 15, wherein the viewing parameters associated with the plurality of client devices at the first time comprise a motion prediction parameter based upon view selections from the plurality of client devices.

* * * * *